Patented May 8, 1923.

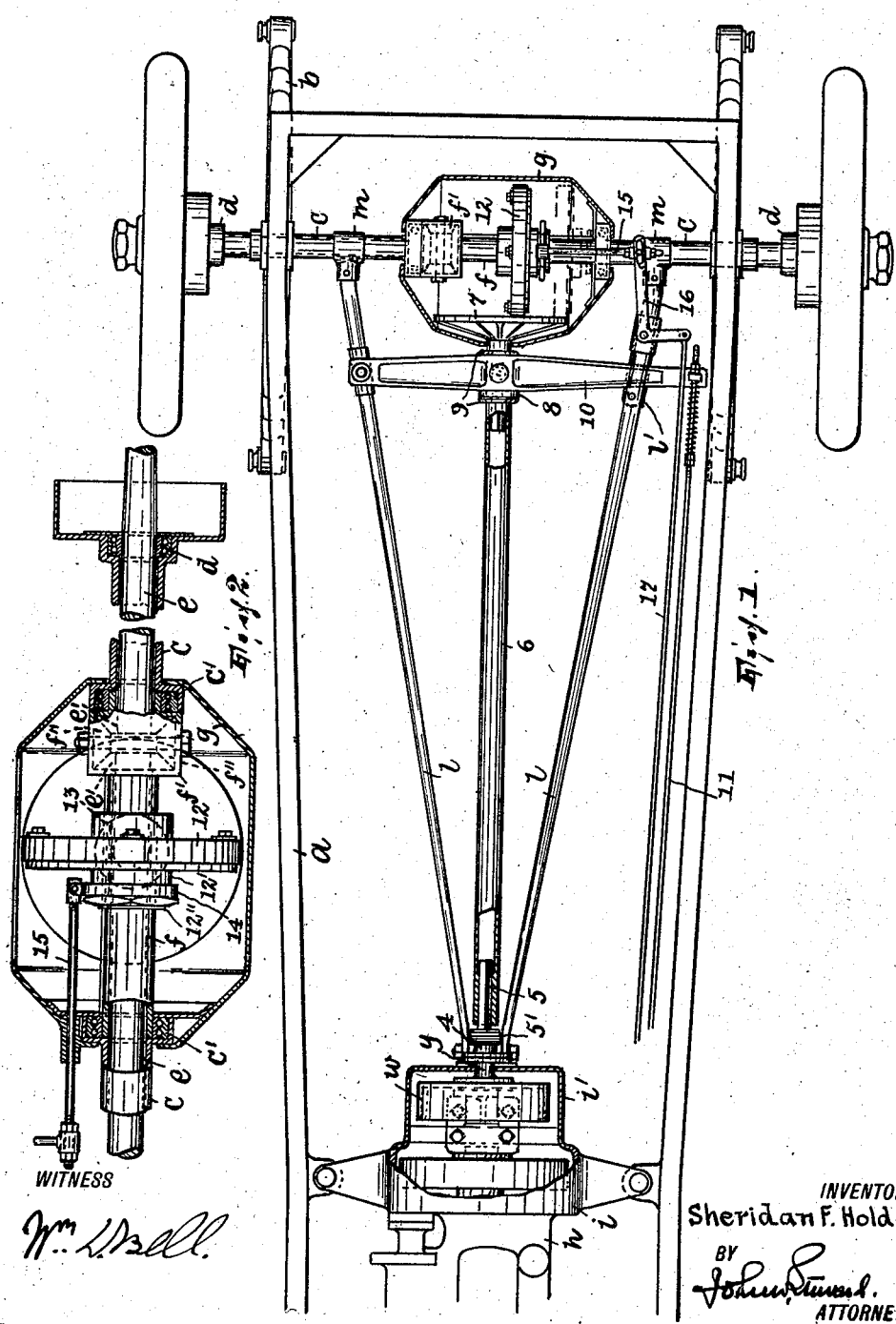

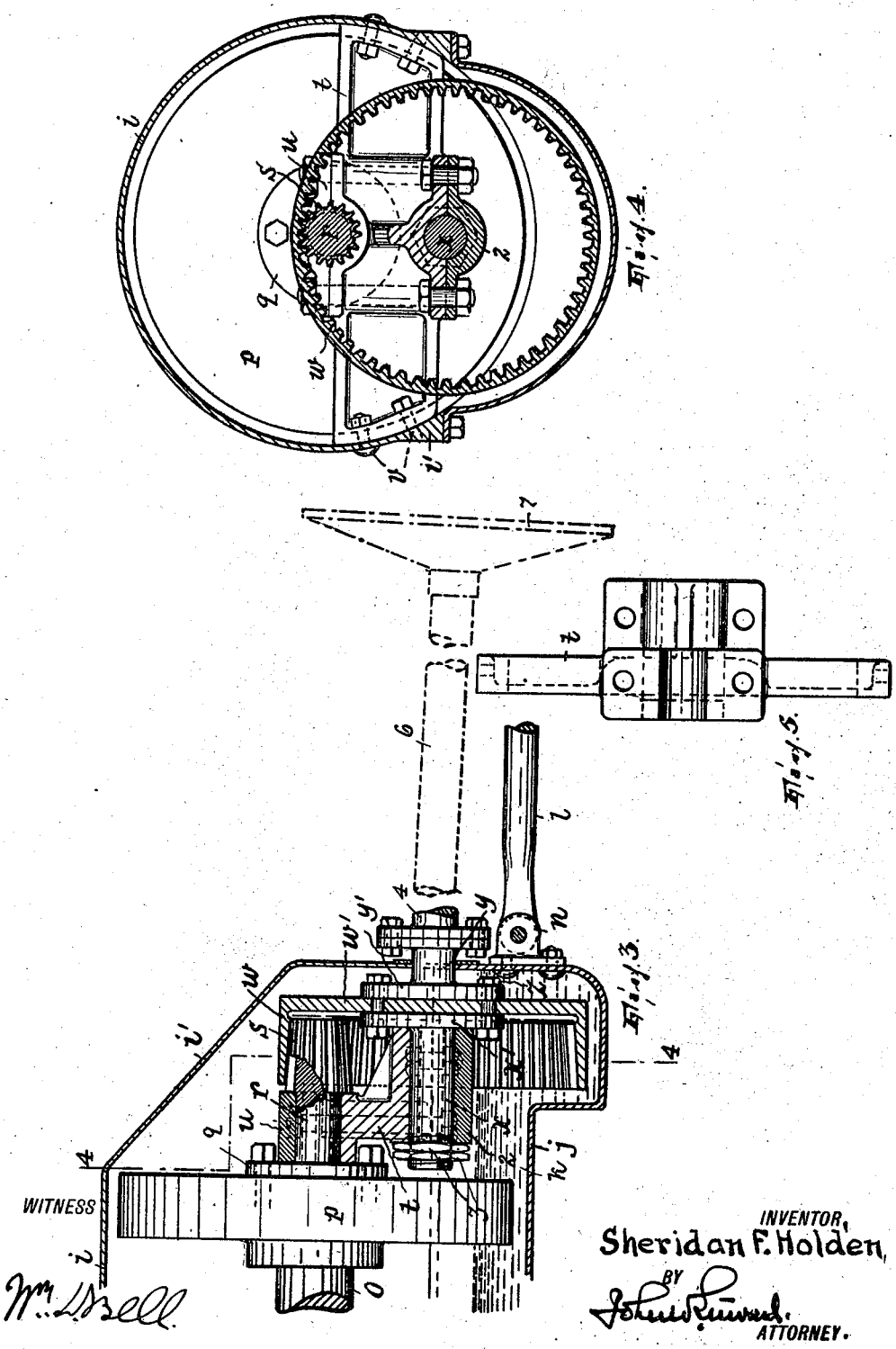

1,454,115

UNITED STATES PATENT OFFICE.

SHERIDAN F. HOLDEN, OF PATERSON, NEW JERSEY.

MOTOR-DRIVEN VEHICLE.

Application filed August 22, 1921. Serial No. 494,356.

*To all whom it may concern:*

Be it known that I, SHERIDAN F. HOLDEN, a citizen of the United States, residing at Paterson, in the county of Passaic and State of New Jersey, have invented certain new and useful Improvements in Motor-Driven Vehicles, of which the following is a specification.

This invention relates to motor-driven vehicles and particularly to motor-driven vehicles in which the means for applying the power variably to the rear or driving axle consists of a face-plate and friction-wheel. In this class of vehicles it is usual to arrange this means so that the face-plate will be driven at engine speed and to arrange the speed-reducing gearing between the same and the driving axle. In consequence, unless care is invariably used in bringing the friction-wheel and face-plate into contact with each other there is likely to result injurious strain and wear, usually of the friction-wheel, before the inertia of the vehicle can be taken up and the friction-wheel assumes the required speed; further, there results considerable loss of traction. These indicate the principal reasons why means of this class, although otherwise in many respects preferable to the more common or stepped-gear type of means for variably applying the power to the driving axle, has not been more extensively utilized.

The principal object of this invention is to improve motor vehicles of the class indicated by reducing the likelihood of injuring any of the parts in the way stated and increasing the traction between the face-plate and friction-wheel. This I accomplish by interposing the speed-reducing gearing between the motor and the variable power-applying means consisting of the face-plate and friction-wheel, so that the face-plate is only capable of a speed corresponding to the maximum speed of the driving axle, which is relatively moderate and generally not sufficient to result in injury to any of the parts through ill-timed manipulation of the face-plate, and is further a speed better adapted for a good tractive effect.

Other objects of the invention will appear hereinafter.

In the drawings,

Figure 1 is a plan, partly in section, of the chassis, motor, rear wheels and power-transmitting mechanism of the improved motor vehicle;

Figure 2 is a vertical sectional view showing the rear axle, a part of said mechanism and a housing therefor;

Figure 3 is a longitudinal vertical sectional view of the parts of said mechanism which adjoin the motor;

Figure 4 is a sectional view thereof on line 4—4, Fig. 3; and

Figure 5 is a plan of a certain bolster.

$a$ is the frame of the vehicle supported at the rear on the springs $b$, in turn supported by and rigidly connected to the rear axle housing sleeves $c$ having bearings $d$ at their outer ends for the axle sections $e$, which at their inner ends have the bevel-pinions $e'$. The inner ends of the sleeves $c$ have ball-bearings $c'$ for a sleeve $f$ which includes the differential casing $f'$ in which are oppositely journaled the bevel-pinions $f''$ in mesh with the pinions $e'$. $g$ is a housing enclosing the sleeve $f$, bearings $c'$ and certain other parts as will appear, being rigidly secured to the bearings $c'$.

The motor is indicated at $h$, mounted on the frame $a$. It has a housing $i$ which is extended rearward, as at $i'$, both housing and extension being open downwardly though usually covered by receptacle $j$ for oil $k$. The axle housing sleeves $c$ are connected to the housing extension $i'$ by brace-rods $l$ which have T's $m$ brazed or otherwise rigidly secured on them and on the sleeves and are bolted to ears $n$ projecting from said housing-extension.

A shaft $o$, as the main shaft of the motor, carries the motor-fly-wheel $p$ and to this is bolted the flange $q$ of the stub-shaft $r$ alined with said shaft, said stub-shaft having fixed thereon the pinion $s$. For supporting the structure $o$, $p$, $q$, $r$ there is a bolster $t$ which with its cap $u$, bolted thereto, affords a bearing for the stub-shaft $r$; the housing-extension $i'$ is interiorly part-cylindrical and the bolster, which rests in the case below its horizontal diameter, has its ends part-cylindrical or rounded to fit and bear against the inner face of said extension, being secured rigidly thereto as by bolts or screws $v$.

In the housing-extension $i'$ is contained a gear-member constructed as follows: $w$ is an internally toothed gear which meshes with the pinion $s$, its disk-wall $w'$ having the flanges $x'$ $y'$ of the alined stub-shaft $x$ $y$ secured thereto by bolts $z$ penetrating said wall. Stub-shaft $x$ is journaled in a bearing formed by the bolster and a cap 2 bolted thereto, such bearing being directly beneath the bearing for stub-shaft $r$; the structure $w$ $x$ $y$ is kept from rearward displacement by the nuts 3 secured on stub-shaft $x$.

Stub-shaft $y$ has a stub-shaft 4 rigidly secured thereto and alined therewith, and stub-shaft 4 in turn has a stub 5, square in cross-section, alined and connected to rotate therewith by a joint $5'$ of any approved form which will permit universal movement of such stub 5. Over the stub 5 is fitted the internally squared end of the transmission shaft 6 which at its rear end carries the face-plate 7 contained in the housing $g$. This shaft 6 is supported near its rear end in a bearing 8 interposed between two collars 9 on the shaft, the bearing being in turn supported by and in a lever 10 which is fulcrumed on one of the brace-rods $l$ and slides on a guide-bracket $l'$ depending from the other. The framing formed by $c$ $l$ and 10 thus not only braces the axle by connecting it to the carrier structure comprising frame $a$ and the motor housing but forms a bearing support for the transmission shaft 6. Shaft 6 has slight longitudinal movement which may be effected from the driver's seat by shifting lever 10 through the medium of an operating rod 11.

Splined on the sleeve $f$ is a friction-wheel 12, capable of movement thereon crosswise of the face-plate. Between a collar $12'$ and a nut $12''$ on the hub of the friction-wheel is a band 14 which embraces said hub, having connected to it the rod 15 which protrudes laterally from casing $g$ and is connected to a bell-crank 16 fulcrumed on one of the brace-rods $l$ and having in turn connected to it the operating rod 17 which extends forward in convenient reach of the driver. By operating rod 17 the driver can rotate the sleeve $f$ and consequently drive the vehicle at various speeds, as will be obvious, either forward or backward.

By this construction the speed of the face-plate is not the same as the engine speed but the same as the much lower maximum speed to be attained by the driving axle $e$, due to interposing the reducing gearing $s$ $w$ between the motor shaft $o$ and the face-plate. If the operator shifts the face-plate against the friction-wheel there can be no injurious strain of the parts.

There is this further distinction between that example of my invention herein set forth and constructions of the ordinary type, involving advantages in the former case over the latter in the way of increased simplicity, greater ability to withstand the wear and tear and shocks and strains incident to travel over uneven roads, and a generally more mechanically perfect arrangement, to wit: that the reducing gearing is incorporated as a part of the motor (its shaft $x$ being incidentally parallel with the motor shaft, so that the simplest type of gearing may be used) and so partakes of the isolation of the motor from the shocks and strains to which the reducing gearing in other vehicles of this class is subjected because of being supported at least indirectly on the axle.

Having thus fully described my invention, what I claim as new and desire to secure by Letters Patent is:—

1. In combination, with the driving axle, a framing projecting therefrom and movable up and down thereon as a pivot and including alined spaced housings containing the axle, a friction wheel concentric and rotative with the axle and arranged between the adjoining ends of the housings, a carrier structure resiliently supported by the housings, said framing being pivoted to said structure at a point removed from and thus bracing the housings and contained axle, a rotating motor shaft and a rotary member journaled in said structure and reduction gearing connecting said shaft and member, and another rotary member journaled in the framing and flexibly connected to the first member and including a face plate to engage the friction wheel.

2. In combination, with the driving axle, a carrier structure, means to support the carrier structure resiliently on the driving axle, a rotating pinion-including member and a rotary internal gear-including member journaled in said structure and having their pinion and gear in mesh with each other, means to transmit rotary motion from the latter member to the axle including a power-transmitting member flexibly connected to said latter member, the first-named means having means affording a bearing for the power-transmitting member.

3. In combination, with the driving axle, a framing movable up and down thereon as a pivot and including alined spaced housings containing the axle and brace rods extending respectively therefrom, a carrier structure resiliently supported by the housings, said brace rods being pivoted to said structure at a point removed from and thus bracing the housings and contained axle, a rotary member journaled in said structure, and means to transmit motion from said member to the axle at a point between the housings including a transmission member flexibly connected to the first member, said framing affording a bearing support for the transmission member.

In testimony whereof I affix my signature.

SHERIDAN F. HOLDEN.